(12) United States Patent
Pasán Garcia et al.

(10) Patent No.: US 11,433,372 B1
(45) Date of Patent: Sep. 6, 2022

(54) STATIONARY PHASE FOR SOLID-PHASE MICROEXTRACTION DEVICE

(71) Applicant: UNIVERSIDAD DE LA LAGUNA, OTRI, Tenerife (ES)

(72) Inventors: Jorge Pasán Garcia, Santa Cruz de Tenerife (ES); Véronica Pino Estévez, Santa Cruz de Tenerife (ES); Ana Ma. Afonso Perera, San Cristobal de la Laguna (ES); Juan H. Ayala Díaz, San Cristobal de la Laguna (ES); Idaira Pacheco Fernández, Tenerife (ES); Priscilía Rocio Bautista, Tenerife (ES)

(73) Assignee: UNIVERSIDAD DE LA LAGUNA, OTRI, La Laguna (ES)

( * ) Notice: Subject to any disclaimer, the term of this patent is extended or adjusted under 35 U.S.C. 154(b) by 0 days.

(21) Appl. No.: 17/617,907

(22) PCT Filed: Jun. 10, 2020

(86) PCT No.: PCT/ES2020/000030
§ 371 (c)(1),
(2) Date: Dec. 9, 2021

(87) PCT Pub. No.: WO2020/249834
PCT Pub. Date: Dec. 17, 2020

(30) Foreign Application Priority Data

Jun. 14, 2019 (ES) .................. 201900092

(51) Int. Cl.
*B01J 20/22* (2006.01)
*B01J 20/28* (2006.01)
*B01J 20/02* (2006.01)

(52) U.S. Cl.
CPC ......... *B01J 20/226* (2013.01); *B01J 20/0225* (2013.01); *B01J 20/28023* (2013.01)

(58) Field of Classification Search
CPC .................. B01J 20/226; B01J 20/0225; B01J 20/2803; B01D 53/02; B01D 53/04; B01D 2253/25
(Continued)

(56) References Cited

U.S. PATENT DOCUMENTS 5,691,206 A   11/1997  Pawliszyn
7,842,827 B2  11/2010  Schubert et al.
(Continued)

FOREIGN PATENT DOCUMENTS

CN   105056915 A   11/2015
CN   105536745 A   5/2016
(Continued)

OTHER PUBLICATIONS

International Search Report prepared by the Spanish Patent and Trademark Office dated Sep. 7, 2020 for related patent application PCT/ES2020/000030, official translation provided.
(Continued)

*Primary Examiner* — Frank M Lawrence, Jr.
(74) *Attorney, Agent, or Firm* — Hassan Abbas Shakir; Shakir Law PLLC

(57) ABSTRACT

The present invention provides a stationary phase for solid-phase microextraction (SPME) devices based on nickel and titanium alloy nuclei and a metal-organic framework (MOF) exterior, which may be used for chromatographic analysis in environmental, food, etc. applications. The method of preparation of the stationary phases consists of a number of steps which provide a covalent adhesion of the MOF to the nickel/titanium alloy. In these stationary phases, the metal-organic framework is the only component that comes into contact with the sample to be analysed. The interior of the stationary phase is executed in nitinol and endows the system with thermal and mechanical stability, this being the first time that it is used to support a metal-organic frame- (Continued)

work, and presenting extractive advantages in comparison with commercial SPME stationary phases.

2 Claims, 2 Drawing Sheets

(58) Field of Classification Search
USPC .................................... 96/108, 154; 502/401
See application file for complete search history.

(56) References Cited

U.S. PATENT DOCUMENTS

| | | | |
|---|---|---|---|
| 2004/0194628 A1* | 10/2004 | Mitra | G01N 30/12 96/101 |
| 2016/0208047 A1 | 7/2016 | Huang | |
| 2021/0023528 A1* | 1/2021 | Chen | B01J 20/24 |

FOREIGN PATENT DOCUMENTS

| | | | |
|---|---|---|---|
| CN | 105572268 A | | 5/2016 |
| ES | 2056644 T3 | | 10/1994 |
| ES | 2356130 T3 | | 4/2011 |

OTHER PUBLICATIONS

Written Opinion prepared by the Spanish Patent and Trademark Office dated Sep. 7, 2020 for related patent application PCT/ES2020/000030, official translation provided.

Ho, Tien D., et al. "Chemical Immobilization of Crosslinked Polymeric Ionic Liquids On Nitinol Wires Produces Highly Robust Sorbent Coatings for Solid-phase Microextraction." Analytica Chimica Acta, vol. 843, Sep. 16, 2014, pp. 18-26.

Pacheco-Fernandez, Idaira et al. :Utlization of highly robust and selective crosslinked polymeric ionic liquid-based sorbent coatings in direct-immersion solid-phase microextraction and high-performance liquid chromatography for determining polar organic pollutants in waters. Taianta, May 14, 2016, vol. 15. pp. 125-133.

Rocio-Bautista, Priscilla et al. "Are metal-organic frameworks able to provide a new generation of solid-phase microextraction coatings?," Analytica Chimica Acta 2016 vol 939, pp. 26-41, Feb. 8, 2016.

Rocio-Bautista, P. et al., "A green metal-organic framework to monitor water contaminants," RSC advances 2018, vol. 8. pp. 31304-31310.

Jia Gao et al., "In situ solvothermal synthesis of metal-organic framework coated fiber for highly sensitive solid-phase microextraction of polycyclic aromatic hydrocarbons,"Journal of Chromatography A, vol. 1436 (2016), pp. 1-8, 2016, Available online Jan. 28, 2016.

* cited by examiner

STATIONARY PHASE FOR SOLID-PHASE MICROEXTRACTION DEVICE

BACKGROUND OF THE INVENTION

1. Field of the Invention

The present invention is directed to contaminant monitoring devices. More particularly, the invention is directed to a stationary phase with metal-organic frameworks (MOF) for a solid-phase microextraction (SPME) system.

2. Discussion of the Related Art

Metal-organic frameworks are crystalline coordination polymers made up of an organic ligand (at least ditopic) and a metal ion or cluster of metal ions with a three-dimensional structure (ES2356130). These materials have permanent porosity and remain crystalline after the activation process wherein the guest molecules are dislodged, with thermal stability in the range of 150 to 200° C. They are characterized by their ease to be modified according to the properties sought.

Solid-phase microextraction (SPME) is an analytical extraction and pre-concentration technique developed by Pawliszyn in 1989 (ES2056644). This technique consists of the use of a stainless steel or fused silica fiber in which the final portion thereof (1 to 3 cm) is coated by a sorbent material with thicknesses between 1 and 100 µm. This technique is consolidated and its use is extended to the analysis of components in the perfume, food, healthcare, environmental, etc. industries.

Since the beginning of the SPME technique, the nuclei of stationary phases are commonly made of fused silica or stainless steel. These materials are easy to functionalize in such a way that the coating is perfectly adhered to the support. However, they have some flaws, in particular, fused silica is brittle and stainless steel is malleable; characteristics that disturb the analyses.

On other occasions, metal-organic frameworks as sorbent material in solid-phase extraction devices have been used using physical adhesion to the support or a combination of sorbent materials, including graphene, ionic liquids or carbon nanotubes (Anal. Bird. Minutes 2016, 939, 26-41) in any case always on nuclei made of stainless steel, fused silica or quartz. There are three patented SPME devices that contain MOFs as part of their stationary phase; in all of them, the metal-organic framework is part of a conglomerate that includes a polymer (US2016208047, CN105572268, CN105536745). The participation of a second component in the stationary phase makes the characterization and reproducibility of the analyses difficult and limits the extractive capacity of the metal-organic framework.

Some examples of these previous embodiments include:

a. Food Chemistry 2018, Vol 263. No. 18. pp. 258-264. It is a stainless steel fiber functionalized with silver, then with MPTES (3-mercaptopropyltriethoxysilane) and then with APTES to then immerse it several times in prefabricated MIL-88 crystals with graphene oxide rotating the fiber several times, In addition to being made of stainless steel, it is impossible to manufacture homogeneous fibers, taking into account that it is the experimenter who rotates the fiber and that successive immersions do not involve covalent grafting, but rather by means of weak interactions that can be detached in deep(direct)-immersion methods.

b. Anal. Chem. 2011, Vol. 83, No. 18. pp. 7094-7101. In this case, stainless steel fiber is immersed directly, without prior functionalization, in a solution containing nanocrystals of different metal-organic frameworks. The bond between the stainless steel fiber and the nanocrystals is an adhesion by means of weak interactions. This fiber, therefore, cannot be used in deep(direct)-immersion systems due to the brittleness of the stainless steel and the poor adherence of the crystals to the substrate.

c. Patent CN105056915A discloses a methodological strategy for a different analysis system of solid-phase microextraction. In this invention, iron oxide particles are functionalized with APTES and the MIL-101(Cr) metal-organic framework to then post-modify it with nucleic acid aptamers. It is not a stationary phase, since the system is made up of particles that are dispersed in the sample and part of an iron oxide (in any case, similar to silica).

d. J. Chromatogr. A 2016, Vol. 1436, pp. 1-8, Chem. Commun. 2013, Vol. 49, pp. 2142-2144 and J. Mater. Chem. A 2014, Vol. 2, No. 34, pp. 13868-13872. In these documents, a fused silica fiber is disclosed, coated with different metal-organic frameworks. As described earlier in this specification, fused silica is very brittle and it is the source of one of the basic problems of SPME, fiber breakage as it passes through the septa of the sample vials or even breakages in the chromatograph injection system itself, which generates many instrumental and economic problems. The robustness of the device is a requirement in certain applications, such as conducting in vivo assays, wherein the brittleness of commercial and silica-based fibers has been highlighted as a considerable disadvantage (TrAC Trends Anal. Chem. 2019, Vol. 115, pp. 203-213).

Throughout the description and the claims, the word "comprises" and its variants do not intend to exclude other technical features. For those skilled in the art, other aspects, advantages and features of the invention may be partially deduced from both the description and the embodiment of the invention.

SUMMARY OF THE INVENTION

The present invention provides a stationary phase for solid-phase microextraction (SPME) devices which may be used for chromatographic analysis in environmental, food, etc. applications. In these stationary phases, the metal-organic framework is the only component that comes into contact with the sample to be analysed. This stationary phase has a cylindrical shape with a nucleus executed in nickel and titanium alloy that endows the system with thermal and mechanical stability and a chemical structure with radial bonds. It is the first time that said nickel/titanium support has been used to support a metal-organic framework.

Nickel/titanium alloys had been previously tested presenting functionalization and adhesion problems due to the coating falling off (peeling-off). Techniques such as sol-gel are used to try to improve adhesion by creating an outer silica surface, on which to anchor a polymer.

The method for preparing the stationary phases consists of several steps that provide a covalent adhesion of the MOF to the nickel/titanium alloy. This sequence of steps produces the aforementioned radial atomic sequence for each of the cases described in the different embodiments of the invention.

The synthesis of the stationary phase is simple, does not require numerous steps and is environmentally sustainable, since it does not use organic solvents (see first preferred embodiment of the invention), unlike other stationary phases previously described. In addition, the synthesis does not require additional materials such as polymers, ionic liquids or carbon nanomaterials acting as a support, adjuvant or support to bind the MOF to the substrate and that can affect the extractive efficiency or the uniformity of the coating and, particularly, substantial differences between consecutive syntheses (with the consequent lack of intrinsic reproducibility).

The stationary phase SPME device described in this invention can be used for the determination of polycyclic aromatic hydrocarbons in water and better extractive efficiencies are obtained compared to those obtained with commercial fibers available under identical conditions.

The SPME device with the stationary phase described in this invention is mechanically superior to other fibers. The nitinol substrate and the covalent bond of the metal-organic framework make the fiber simultaneously elastic and robust. In this way, it does not present the problems of other stationary phases for SPME devices in their regular use: i) breakage as it passes through the septum of the vials or septum of the injector (silica), ii) malleability and plasticity (stainless steel), iii) oxidizable and malleable (copper), iv) cost (platinum, gold and silver). The SPME device with the stationary phase described in this invention is chemically stable in most organic solvents used in liquid chromatography (acetonitrile, ethanol, methanol, acetone, etc.) or in gas chromatography (hexane, chloroform, etc.) and in water. Therefore, there are no losses or deformations of the sorbent material that make the device lose its qualities. Sorbent materials bonded to substrates by means of glues or non-covalent bonds present material losses and detachments, preventing its use in 'direct-immersion' or solvent-assisted desorption (see for example: sigmaaldrich.com/content/dam/sigma-aldrich/docs/Supelco/General_Information/1/SPME_for_GC_brochure_MRK_final_web.pdf).

The SPME fibers described in this invention, due to the chemical stability and robustness they present, can be used both in vortex-assisted liquid desorption systems for liquid chromatography analysis. This desorption strategy is not used with previously existing SPME devices since the fiber breaks or the stationary phase is destroyed therein.

The SPME fibers described in this invention, due to the robustness of the substrate and the covalent bond of the metal-organic framework, in addition to the biocompatibility of substrate and MOF, can be used in in vivo applications, where silica substrates, due to the brittleness thereof, are discarded.

The SPME device with the stationary phases manufactured according to this methodology is activated at 150° C. for 3 hours to evacuate the solvent that could have remained in the pores of the MOF. Once activated, the SPME device is stable for use in head-space (HS) techniques, in direct immersion (DI). When using the device in HS, its maximum RSD (%) for analysis on the same day, in several days, or with several fibers is 13, 15 and 15%, respectively. When using the device in DI, its RSD (%) for analysis on the same day, in several days, or with several fibers is 10, 17 and 20%, respectively.

BRIEF DESCRIPTION OF THE FIGURES

To complement the description that is being made and for the purpose of making the features of the invention more readily understandable, a set of drawings is attached as an integral part of said description wherein the following has been depicted, with an illustrative and non-limiting character.

DETAILED DESCRIPTION OF THE INVENTION

The following examples are provided by way of illustration and are not intended to limit the present invention.

Figure 1:
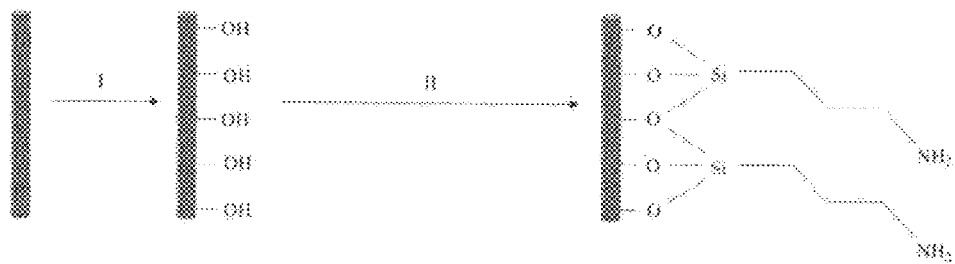
FIG. 1 is a representative diagram of the pretreatment of the metallic fiber. I=base, II=(3-aminopropyltriethoxysilane applied for 3 h at room temperature.
Figure 2:
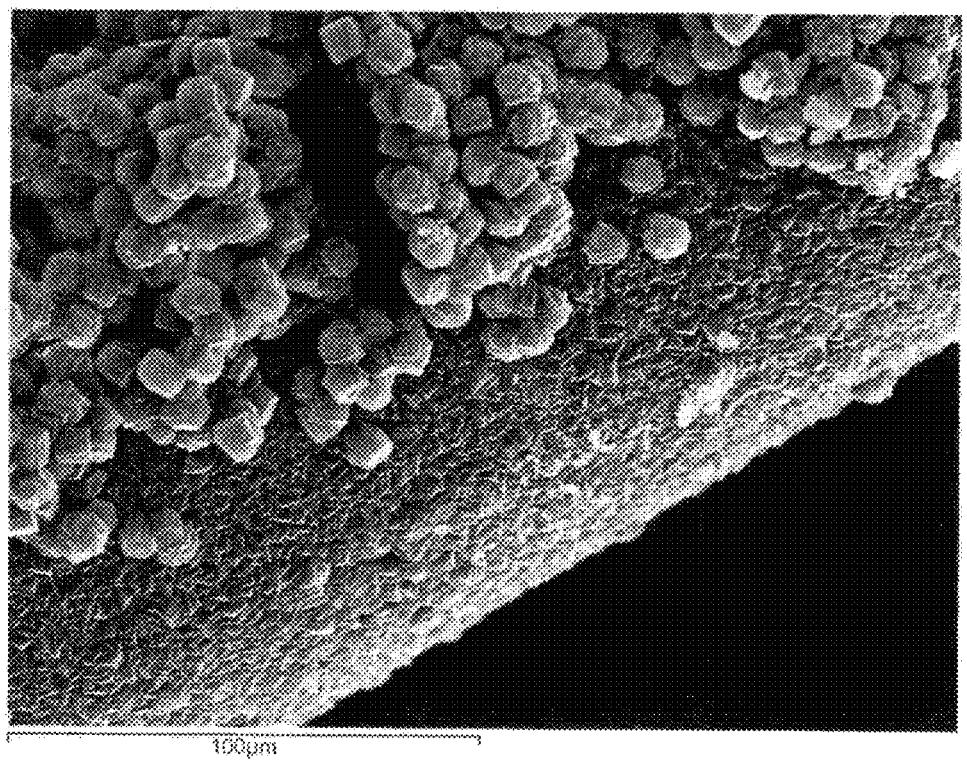
FIG. 2 is a scanning electron microscopy image of one of the fibers with the MOF coating.

In one embodiment of the invention, the stationary phase of the radial atomic sequence Ni/Ti—O—Si—$CH_2$—$(CH_2)_4$—$CH_2$—$NH_2$—Al—O—C-metal-organic framework (MOF) is obtained by means of three steps: i) immersion of the nucleus in an alkaline solution, ii) adhesion of a silane with amino-terminal functionalization and iii) growth of the MOF by means of a solvothermal technique. The detailed method is as follows:

1. A nitinol fiber is used and immersed in a solution of $H_2O_2$ (5-30% v/v) for 1-3 hours at reflux. The fiber is extracted and washed with distilled water and ethanol. The fiber is then introduced into a vial containing (3-aminopropyl) triethoxysilane for 2-24 hours at 30-50° C. The fiber is extracted and washed with ethanol (FIG. 1).

2. 1 cm of the pretreated fiber is immersed in an aqueous solution (15 ml) containing 1 mmol of mesaconic acid, 1 mmol of aluminum nitrate nonahydrate and 0.5 mmol of urea in a 26 ml glass vial, sealed with Teflon and capped.

3. The vial is kept at 150° C. for at least 2 hours, to then take it out of the oven and let it cool in the air.

4. The fiber is extracted from the solution and washed abundantly with distilled water, ethanol and acetone.

5. The SPME device with the fiber coated with the stationary phase MOF is introduced into the injector of a gas chromatograph and is kept at 150° C. for 3 hours under a constant flow of $N_2$ to activate the MOF and remove any molecules that may have become trapped in the pores.

Figure 3:
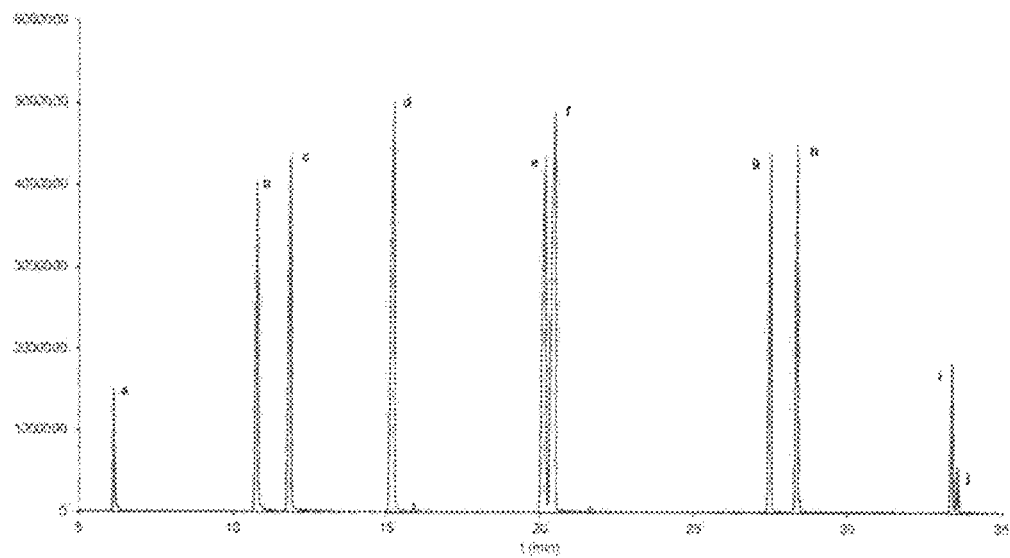
FIG. 3 is a chromatogram obtained during the determination of 10 polycyclic aromatic hydrocarbons (a=naphthaphene, b=acenaphthylene, c=acenaphthene, d=fluorene, e=phenanthrene, f=anthracene, g=fluoranthene, h=pyrene, i=benz(a)anthracene, and j=chrysene) at a concentration of 50 ppb in 10 ml of water using an SPME device with the stationary phase MOF prepared by means of the method described and using the head-space (HS) technique with an extraction time of 60 minutes and an extraction temperature of 75° C. and stirring. After extraction, desorption is performed in the injector of a gas chromatograph at 280° C. for 4 minutes.

6. An analytical determination of 10 polycyclic aromatic hydrocarbons at a concentration of 50 ppb in 10 ml of water is carried out using the head-space (HS) technique with an extraction time of 60 minutes and an extraction temperature of 75° C. and stirring. After extraction, desorption is performed in the injector of a gas chromatograph at 280° C. for 4 minutes. The chromatogram obtained is shown in FIG. 3.

Figure 4:
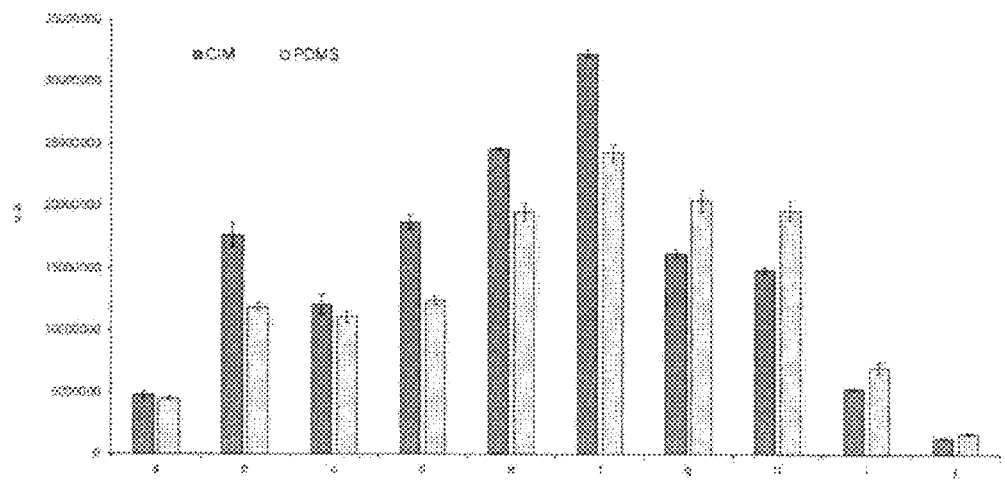
FIG. 4 is a comparison of the peak areas of the chromatogram obtained for the SPME fiber (using HS-SPME-gas chromatography) with the stationary phase manufactured according to this invention and a commercial SPME fiber with PDMS as the stationary phase (a=naphthalene b=acenaphthylene, c=acenaphthene, d=fluorene, e=phenanthrene, f=anthracene, g=fluoranthene, h=pyrene, i=benz(a)anthracene, and j=chrysene).

7. The peak areas obtained for the SPME device with the stationary phase obtained according to the described method and the comparison with a SPME device with conventional polydimethylsiloxane (PDMS) stationary phase under the same conditions are shown in FIG. 4. As can be observed, for small-size hydrocarbons, the new stationary phase significantly improves performance, whereas for heavy hydrocarbons, performance is similar.

In another embodiment of the invention, the stationary phase of radial atomic sequence Ni/Ti—O—Si—CH$_2$—(CH$_2$)$_4$—CH$_2$—NH—(CO—(C$_6$H$_4$)—COO—Al—O—C-metal-organic framework (MOF) is obtained in four steps, i) immersion of the nucleus in an alkaline solution, ii) adhesion of a silane with amino-terminal functionalization, iii) amide formation with an acid chloride and iv) growth of the MOF by means of a solvothermal technique, according to the method:

1. A nitinol fiber is used and immersed in a solution of H$_2$O$_2$ (5-30% v/v) for 1-3 hours at reflux. The fiber is extracted and washed with distilled water and ethanol. The fiber is then introduced into a vial containing (3-aminopropyl) triethoxysilane for 2-24 hours at 30-50° C. The fiber is extracted and washed with ethanol (FIG. 1).

2. The fiber is immersed in a tetrahydrofuran solution in which terephthaloyl chloride and triethylamine have been dissolved (in equimolar amounts). This solution is refluxed for 24 hours. After this period, the fiber is washed with distilled water and acetone.

3. 1 cm of the pretreated fiber is immersed in an aqueous solution (15 ml) containing 1 mmol of fumaric acid, 1 mmol of aluminum nitrate nonahydrate and 0.5 mmol of urea in a 26 ml glass vial, sealed with Teflon and capped. The vial is kept at 150° C. for at least hours, to then take it out of the oven and let it cool in the air.

4. The fiber is extracted from the solution and washed abundantly with distilled water, ethanol and acetone.

5. The SPME device with the fiber coated with the stationary phase MOF is introduced into the injector of a gas chromatograph and is kept at 150° C. for 3 hours under a constant flow of N$_2$ to activate the MOF and remove any molecules that may have become trapped in the pores.

In another embodiment of the invention the stationary phase of the radial atomic sequence Ni/Ti—O—Si—CH$_2$—(CH$_2$)$_4$—CH$_2$—NH$_2$—Al—O—C-metal-organic framework (MOF) is obtained by means of three steps: i) immersion of the nucleus in an alkaline solution, ii) adhesion of a silane with amino-terminal functionalization and iii) growth of the MOF by means of a solvothermal technique. The detailed method is as follows:

1. A nitinol fiber is used and immersed in a solution of H$_2$O$_2$ (5-30% v/v) for 1-3 hours at reflux. The fiber is extracted and washed with distilled water and ethanol. The fiber is then introduced into a vial containing (3-aminopropyl) triethoxysilane for 2-24 hours at 30-50° C. The fiber is extracted and washed with ethanol (FIG. 1).

2. 1 cm of the pretreated fiber is immersed in an aqueous solution (15 ml) containing 1 mmol of terephthalic acid, 1 mmol of aluminum nitrate nonahydrate in a 23 ml Teflon reactor.

3. The reactor is kept at 20 C. for 72 hours, to then take it out of the oven and let it cool in the air.

4. The fiber is extracted from the solution and washed abundantly with distilled water, ethanol and acetone.

5. The SPME device with the fiber coated with the stationary phase MOF is introduced into the injector of a gas chromatograph and is kept at 350° C. for 3 hours under a constant flow of N$_2$ to activate the MOF and remove any molecules that may have become trapped in the pores.

6. The fiber thus treated can be used for the determination of non-volatile molecules by means of direct-immersion, to then carry out the elution in a small volume of an organic solvent (compatible with the usual mobile phases of HPLC) and vortex stirring and finally carry out the injection for analytical determination in a HPLC chromatograph. Other types of solvents can be used, and then incorporate a step of solvent exchange to ensure compatibility with HPLC.

What is claimed is:

1. Stationary phase for solid-phase microextraction device comprising a nitinol substrate, an intermediate covalently bonded to the substrate, wherein the intermediate is Ni/Ti—O—Si—CH$_2$—(CH$_2$)$_4$—CH$_2$—NH$_2$—Al—O—C-metal-organic framework or Ni/Ti—O—Si—CH$_2$—(CH$_2$)$_4$—CH$_2$—NH—CO—(C$_6$H$_4$)—COO—Al—O—C-metal-organic framework, and a metal-organic framework, which is aluminum(III) mesaconate, aluminum(III) fumarate, aluminum(III) terephthalate or a mixture thereof, covalently bonded to the intermediate.

2. Solid-phase microextraction device comprising a stationary phase according to claim 1.

* * * * *